(12) United States Patent
Yang et al.

(10) Patent No.: US 9,769,872 B2
(45) Date of Patent: Sep. 19, 2017

(54) METHOD AND APPARATUS FOR IMPLEMENTING SERVICE DISTRIBUTION FOR DUAL-NETWORK DUAL-STANDBY TERMINAL

(75) Inventors: Qi Yang, Shenzhen (CN); Zhuan Yin, Shenzhen (CN); Yide Wei, Shenzhen (CN)

(73) Assignee: ZTE Corporation (CN)

( * ) Notice: Subject to any disclaimer, the term of this patent is extended or adjusted under 35 U.S.C. 154(b) by 197 days.

(21) Appl. No.: 13/995,016

(22) PCT Filed: Apr. 18, 2011

(86) PCT No.: PCT/CN2011/072930
§ 371 (c)(1),
(2), (4) Date: Jun. 17, 2013

(87) PCT Pub. No.: WO2012/079330
PCT Pub. Date: Jun. 21, 2012

(65) Prior Publication Data
US 2013/0267272 A1    Oct. 10, 2013

(30) Foreign Application Priority Data

Dec. 15, 2010 (CN) .......................... 2010 1 0589602

(51) Int. Cl.
*H04W 88/06* (2009.01)
*H04W 36/00* (2009.01)
(Continued)

(52) U.S. Cl.
CPC ............ *H04W 88/06* (2013.01); *H04B 1/406* (2013.01); *H04W 36/0066* (2013.01); *H04W 48/18* (2013.01); *H04W 88/10* (2013.01)

(58) Field of Classification Search
USPC ..................................................... 455/552.1
See application file for complete search history.

(56) References Cited

U.S. PATENT DOCUMENTS 6,141,564 A * 10/2000 Bruner .................. H04W 88/06
379/357.01
7,916,696 B2    3/2011 Noh et al.
(Continued)

FOREIGN PATENT DOCUMENTS

CN    1753553 A    3/2006
CN    1856170       11/2006
(Continued)

OTHER PUBLICATIONS

International Search Report for PCT/CN2011/072930, English translation attached to original, Both completed by the Chinese Patent Office on Sep. 7, 2011, All together 8 Pages.
(Continued)

*Primary Examiner* — Yuwen Pan
*Assistant Examiner* — Zhitong Chen
(74) *Attorney, Agent, or Firm* — Brooks Kushman P.C.

(57) ABSTRACT

A method and apparatus used for a dual-network dual-standby terminal implementing service distribution are disclosed in the present document. The dual-network dual-standby terminal includes an application module, a first communication module and a second communication module. When a user of the dual-network dual-standby terminal initiates a Circuit Switched (CS) service, the application module selects the first communication module, and the first communication module performs communication through a 2G network; when a user of the dual-network dual-standby terminal initiates a Packet Switched (PS) service, the application module selects the second communication module, and the second communication module performs communication through a 3G network or a 2G network.

6 Claims, 4 Drawing Sheets

(51) Int. Cl.
*H04B 1/403* (2015.01)
*H04W 88/10* (2009.01)
*H04W 48/18* (2009.01)

(56) References Cited

U.S. PATENT DOCUMENTS

2006/0233136 A1* 10/2006 Noh ..................... H04W 88/06
370/331
2009/0163240 A1   6/2009 Ryu et al.
2010/0227591 A1*  9/2010 Park ..................... H04W 12/06
455/411
2012/0040670 A1*  2/2012 Chin ................... H04W 60/005
455/435.1

FOREIGN PATENT DOCUMENTS

| CN | 101035342 | 9/2007 | | |
|----|-----------|--------|---|---|
| CN | 101068406 | 11/2007 | | |
| CN | 101068412 | 11/2007 | | |
| CN | 101207900 A | 6/2008 | | |
| CN | 101350969 | 1/2009 | | |
| CN | 101409947 | 4/2009 | | |
| CN | 101409947 A | * 4/2009 | ............ | H04W 88/06 |
| EP | 1523150 | 4/2005 | | |
| EP | 2542018 | 1/2013 | | |
| EP | 2542021 | 1/2013 | | |
| EP | 2544504 | 1/2013 | | |

OTHER PUBLICATIONS

Extended European Search Report for EP 11848194.4, Completed by the European Patent Office, Dated Sep. 3, 2014, 12 Pages.
Office Action for Chinese application No. 201010589602.7, English translation attached to original, both completed by the Chinese Patent Office dated Sep. 30, 2013, all together 12 pages.

* cited by examiner

METHOD AND APPARATUS FOR IMPLEMENTING SERVICE DISTRIBUTION FOR DUAL-NETWORK DUAL-STANDBY TERMINAL

CROSS-REFERENCE TO RELATED APPLICATION

This application is the U.S. national phase of PCT Application No. PCT/CN2011/072930 filed on Apr. 18, 2011, which claims priority to Chinese Patent Application No. 201010589602.7 filed on Dec. 15, 2010, the disclosures of which are incorporated in their entirety by reference herein.

TECHNICAL FIELD

The present document relates to the field of mobile communication, and particularly, to a method and apparatus for a dual-network dual-standby terminal implementing service distribution.

BACKGROUND OF THE RELATED ART

With the gradual development of the domestic 3G network construction, the three major mobile communication operators all formally step into the 3G. However, currently, at the initial period of the construction of the 3G network and within the following development period, when compared with the 2G network which has went through a dozen years of continuous optimization and improvement, since the coverage level of the 3G network has a comparatively large gap with the 2G network with respect to the coverage breadth (e.g. the 2G network nearly covers all national natural villages) or the coverage depth (such as indoor places, basement and metro, etc.), all the major operators invariably take a long-term coexistence between 2G network and 3G network as their operation objective and policy. The China Mobile even raised the "three noes" principle, that is, no card changed, no number changed and no registration required, and a Time Division-Synchronous Code Division Multiple Access (TD-SCDMA)/Global System for Mobile Communication (GSM) dual-mode single-standby customized mobile phone terminal to promote and operate their own TD-SCDMA 3G network.

However, this policy of the coexistence between 2G network and 3G network, and the TD-SCDMA/GSM dual-mode single-standby terminal customization encounters problems in the real operation. On the one hand, since the existing policy of 2G and 3G dual-mode handover causes that abnormal failures such as frequent mobile phone terminal reselections, serious power consumption, call drops, network surfing stream interruption, and even off-network and so on happen occasionally, and user experience is comparatively worse; on the other hand, since the existing 3G network coverage quality is greatly inferior to that of the GSM network, which causes that the users lack confidence in the TD-SCDMA network. The problems of the network lead to the predicament of the terminal, and the predicament of the terminal conversely amplifies the problems of the network.

SUMMARY OF THE INVENTION

The technical problem required to be solved by the present document is to overcome the above shortages in the related art and propose a method and apparatus for a dual-network dual-standby terminal performing communication, so as to reduce and avoid failures such as frequent network reselection, serious power consumption, call drops and off-network and so on caused by a 2/3G dual-mode single-standby terminal due to a 2G/3G dual-mode handover policy, and improve the user experience of the terminal.

In order to solve the above problem, the present document provides a method for a dual-network dual-standby terminal implementing service distribution, wherein, the dual-network dual-standby terminal comprises an application module, a first communication module and a second communication module, and the method comprises:

when a user of the dual-network dual-standby terminal initiates a Circuit Switched (CS) service, the application module selecting the first communication module, and the first communication module performing communication through a 2G network;

when a user of the dual-network dual-standby terminal initiates a Packet Switched (PS) service, the application module selecting the second communication module, and the second communication module performing communication through a 3G network or a 2G network.

Preferably, the above method is characterized in that:

in the step of the second communication module performing communication through a 3G network or a 2G network, the second communication module preferentially selects to perform communication through the 3G network.

Preferably, the above method is characterized in that:

the 3G network is a Time Division-Synchronous Code Division Multiple Access (TD-SCDMA) network, and the 2G network is a Global System for Mobile Communication (GSM) network;

the first communication module is a GSM wireless communication module, and the second communication module is a TD-SCDMA/GSM dual-mode single-standby wireless communication module.

Preferably, the dual-network dual-standby terminal further comprises an identity identification module, the identity identification module is connected with the first communication module, an identity identification card is inserted in the identity identification module, and information used for the 2G network and the 3G network performing identity authentication is saved in the identity identification card; the application module contains a proxy module;

the method further comprises:

after the dual-network dual-standby terminal starts up, the first communication module reading the information in the identity identification card in the identity identification module, saving the information in the identity identification card into the proxy module, and using the information in the identity identification card to register to the 2G network;

the second communication module reading the information in the identity identification card in the proxy module, and using the read information to register to the 3G network or the 2G network.

Preferably, the dual-network dual-standby terminal further comprises an identity identification module, the identity identification module is connected with the second communication module, an identity identification card is inserted in the identity identification module, and information used for the 2G network and the 3G network performing identity authentication is saved in the identity identification card; the application module contains a proxy module;

the method further comprises:

after the dual-network dual-standby terminal starts up, the second communication module reading the information in the identity identification card in the identity identification module, saving the information in the identity identification card into the proxy module, and using the information in the identity identification card to register to the 3G network or the 2G network;

the first communication module reading the information in the identity identification card in the proxy module, and using the read information to register to the 2G network.

Preferably, the dual-network dual-standby terminal further comprises an identity identification module, the identity identification module is connected with the first communication module and the second communication module, an identity identification card is inserted in the identity identification module, and information used for the 2G network and the 3G network performing identity authentication is saved in the identity identification card;

the method further comprises:

after the dual-network dual-standby terminal starts up, the first communication module and the second communication module reading the information in the identity identification card in the identity identification module in turn, and using the information in the identity identification card to register to the corresponding networks.

Preferably, the dual-network dual-standby terminal further comprises an identity identification module, the identity identification module is connected with the first communication module, an identity identification card is inserted in the identity identification module, and information used for the 2G network and the 3G network performing identity authentication is saved in the identity identification card; the first communication module contains a first proxy module, and the second communication module contains a second proxy module;

the method further comprises:

after the dual-network dual-standby terminal starts up, the first communication module reading the information in the identity identification card in the identity identification module, saving the information in the identity identification card into the first proxy module of the first communication module itself, and using the information in the identity identification card to register to the 2G network;

the second communication module reading the information in the identity identification card in the first proxy module to save into the second proxy module of the second communication module itself, and using the information in the identity identification card in the second proxy module to register to the 3G network or the 2G network.

Preferably, the dual-network dual-standby terminal further comprises an identity identification module, the identity identification module is connected with the second communication module, an identity identification card is inserted in the identity identification module, and information used for the 2G network and the 3G network performing identity authentication is saved in the identity identification card; the first communication module contains a first proxy module, and the second communication module contains a second proxy module;

the method further comprises:

after the dual-network dual-standby terminal starts up, the second communication module reading the information in the identity identification card in the identity identification module, saving the information in the identity identification card into the second proxy module of the second communication module itself, and using the information in the identity identification card to register to the 3G network or the 2G network;

the first communication module reading the information in the identity identification card in the second proxy module to save into the first proxy module of the first communication module itself, and using the information in the identity identification card in the first proxy module to register to the 2G network.

Preferably, the dual-network dual-standby terminal further comprises an identity identification module and a proxy module which are connected, the proxy module is connected with the first communication module and the second communication module, an identity identification card is inserted in the identity identification module, and information used for the 2G network and the 3G network performing identity authentication is saved in the identity identification card;

the method further comprises:

after the dual-network dual-standby terminal starts up, the proxy module reading and saving the information in the identity identification card;

the first communication module and the second communication module reading the information in the identity identification card in the proxy module, and using the read information to register to the corresponding networks.

In order to solve the above problem, the present document provides an apparatus used for a dual-network dual-standby terminal implementing service distribution, which comprises an application module, a first communication module and a second communication module, wherein:

the application module is configured to: when a user of the dual-network dual-standby terminal initiates a Circuit Switched (CS) service, select the first communication module, and when a user of the dual-network dual-standby terminal initiates a Packet Switched (PS) service, select the second communication module;

the first communication module is configured to: perform communication through a 2G network according to the selection of the application module; and the second communication module is configured to: perform communication through a 3G network or a 2G network according to the selection of the application module.

Preferably, the above apparatus is characterized in that:

the second communication module is configured to: preferentially select to perform communication through the 3G network.

Preferably, the above apparatus is characterized in that:

the 3G network is a Time Division-Synchronous Code Division Multiple Access (TD-SCDMA) network, and the 2G network is a Global System for Mobile Communication (GSM) network;

the first communication module is a GSM wireless communication module, and the second communication module is a TD-SCDMA/GSM dual-mode single-standby wireless communication module.

Preferably, the above apparatus further comprises an identity identification module, wherein the identity identification module is connected with the first communication module, an identity identification card is inserted in the identity identification module, and information used for the 2G network and the 3G network performing identity authentication is saved in the identity identification card; the application module contains a proxy module;

the first communication module is further configured to: after the dual-network dual-standby terminal starts up, read the information in the identity identification card in the identity identification module, save the information in the identity identification card into the proxy module, and use the information in the identity identification card to register to the 2G network;

the second communication module is further configured to: read the information in the identity identification card in the proxy module, and use the read information to register to the 3G network or the 2G network.

Preferably, the above apparatus further comprises an identity identification module, wherein the identity identification module is connected with the second communication module, an identity identification card is inserted in the identity identification module, and information used for the 2G network and the 3G network performing identity authentication is saved in the identity identification card; the application module contains a proxy module;

the second communication module is further configured to: after the dual-network dual-standby terminal starts up, read the information in the identity identification card in the identity identification module, save the information in the identity identification card into the proxy module, and use the information in the identity identification card to register to the 3G network or the 2G network;

the first communication module is further configured to: read the information in the identity identification card in the proxy module, and use the read information to register to the 2G network.

Preferably, the above apparatus further comprises an identity identification module, wherein the identity identification module is connected with the first communication module and the second communication module, an identity identification card is inserted in the identity identification module, and information used for the 2G network and the 3G network performing identity authentication is saved in the identity identification card;

the first communication module is further configured to: after the dual-network dual-standby terminal starts up, read the information in the identity identification card in the identity identification module, and use the information in the identity identification card to register to the 2G network;

the second communication module is further configured to: after the dual-network dual-standby terminal starts up, read the information in the identity identification card in the identity identification module, and use the information in the identity identification card to register to the 3G network or the 2G network.

Preferably, the above apparatus further comprises an identity identification module, wherein the identity identification module is connected with the first communication module, an identity identification card is inserted in the identity identification module, and information used for the 2G network and the 3G network performing identity authentication is saved in the identity identification card; the first communication module contains a first proxy module, and the second communication module contains a second proxy module;

the first communication module is further configured to: after the dual-network dual-standby terminal starts up, read the information in the identity identification card in the identity identification module, save the information in the identity identification card into the first proxy module of the first communication module itself, and use the information in the identity identification card to register to the 2G network;

the second communication module is further configured to: read the information in the identity identification card in the first proxy module to save into the second proxy module of the second communication module itself, and use the information in the identity identification card in the second proxy module to register to the 3G network or the 2G network.

Preferably, the above apparatus further comprises an identity identification module, wherein the identity identification module is connected with the second communication module, an identity identification card is inserted in the identity identification module, and information used for the 2G network and the 3G network performing identity authentication is saved in the identity identification card; the first communication module contains a first proxy module, and the second communication module contains a second proxy module;

the second communication module is further configured to: after the dual-network dual-standby terminal starts up, read the information in the identity identification card in the identity identification module, save the information in the identity identification card into the second proxy module of the second communication module itself, and use the information in the identity identification card to register to the 3G network or the 2G network;

the first communication module is further configured to: read the information in the identity identification card in the second proxy module to save into the first proxy module of the first communication module itself, and use the information in the identity identification card in the first proxy module to register to the 2G network.

Preferably, the above apparatus further comprises an identity identification module and a proxy module which are connected, wherein the proxy module is connected with the first communication module and the second communication module, an identity identification card is inserted in the identity identification module, and information used for the 2G network and the 3G network performing identity authentication is saved in the identity identification card;

the proxy module is configured to: after the dual-network dual-standby terminal starts up, read and save the information in the identity identification card;

the first communication module is further configured to: read the information in the identity identification card in the proxy module, and use the read information to register to the 2G network;

the second communication module is further configured to: read the information in the identity identification card in the proxy module, and use the read information to register to the 3G network or the 2G network.

With the method and apparatus of the present document, compared with the existing 2/3G dual-mode single-standby terminal technology, and when considering both the advantage of CS services of 2G network and the advantage of data services of 3G network, the probability of dual-mode handover is reduced through the dual-network dual-standby technology (only a part of handover exists during the data services), which fundamentally reduces and avoids the failures such as frequent network reselection, serious power consumption, call drops and off-network and so on caused by the 2/3G dual-mode single-standby terminal due to the 2G/3G dual-mode handover policy. The user experience of the terminal is improved, and the development of the 3G network is also promoted.

Moreover, in the technical scheme of the present document, it is not required to make a change on the network, and the operators can almost solve the problems faced currently with zero investment.

PREFERRED EMBODIMENTS OF THE INVENTION

The examples of the present document will be described in detail in combination with the accompanying drawings below. It should be noted that the examples in the present document and the characteristics in the examples can be optionally combined with each other in the condition of no conflict.

The basic idea of the present document is, with respect to the characteristics that the 3G network is with comparatively large bandwidth and is appropriate for data services and for the 2G network, the optimization work accumulates a lot and 2G services such as voices and so on are supported better, adding a 2 G communication module (i.e. a 2G Modem) based on the current dual-mode single-standby 3G terminal, and implementing a distribution of PS services and CS services of the terminal by means of using the 2G Modem to bear the CS services and using the dual-mode single-standby Modem to bear the PS data services.

Figure 1:
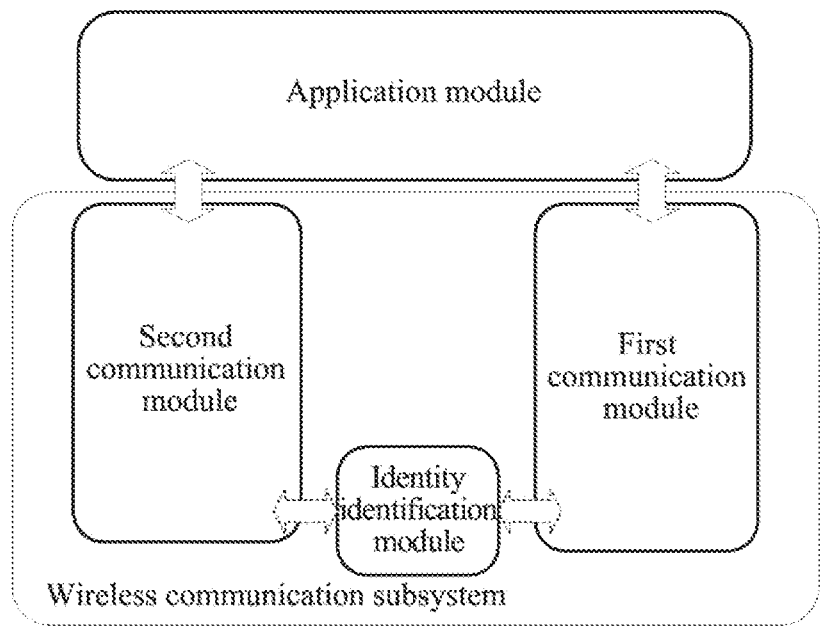
FIG. 1 is a schematic diagram of an apparatus used for a dual-network dual-standby terminal performing communication according to the example of the present document.
Figure 2:
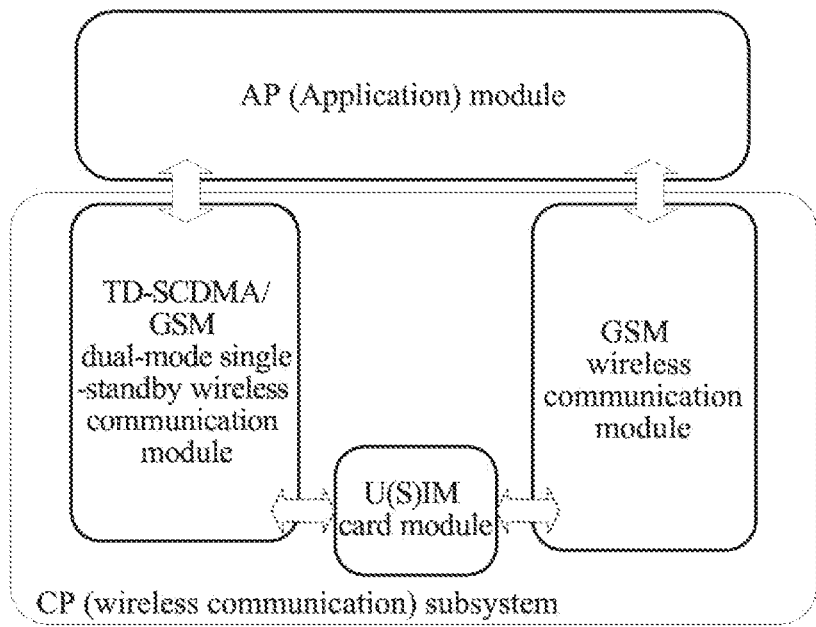
FIG. 2~FIG. 7 are schematic diagrams of the apparatus used for the dual-network dual-standby terminal performing communication according to the application examples of the present document.

Specifically, as shown in FIG. 1, a dual-network dual-standby terminal can include an application module, a first communication module (i.e. the 2 G communication module) and a second communication module (i.e. a 2G and 3G dual-mode single standby communication module), the first communication module and the second communication module constitutes a wireless communication subsystem.

When a user of the dual-network dual-standby terminal initiates a CS service, the application module selects the first communication module, and the first communication module performs communication through the 2G network;

when a user of the dual-network dual-standby terminal initiates a PS service, the application module selects the second communication module, and the second communication module performs communication through the 3G network or the 2G network.

When performing communication, the second communication module preferentially selects to perform communication through the 3G network. That is, if the 3G network satisfies a condition of signal strength, the 3G network is selected to perform the communication, and if the 3G network does not satisfy a condition of signal strength, the 2G network is selected to perform the communication.

The dual-network dual-standby terminal also includes an identity identification module (i.e. a Universal (Subscriber) Identity Module (U(S)IM) card module), an identity identification card is inserted in the identity identification module, and information used for the 2G network and the 3G network performing identity authentication is saved in the identity identification card.

The identity identification module can only be connected with the first communication module, or only be connected with the second communication module, or be connected with both the first communication module and the second communication module.

In order to read the information in the identity identification card by the first communication module and the second communication module and to communicate with the corresponding networks, a proxy module (i.e. an SIM Proxy module) can be utilized to access the identity identification card and share the information by the two communication modules.

According to connection statuses between the identity identification module and the communication modules, there can be a plurality of schemes below.

Scheme One

The identity identification module is only connected with the first communication module.

1. The proxy module is located in the application module; after the dual-network dual-standby terminal starts up, the first communication module reads the information in the identity identification card in the identity identification module, saves the information in the identity identification card into the proxy module, and uses the information in the identity identification card to register to the 2G network;

the second communication module reads the information in the identity identification card in the proxy module, and uses the read information to register to the 3G network or the 2G network.

2. The proxy module is located in first communication module and the second communication module, the proxy module is divided into a first proxy module and a second proxy module at the point, the first communication module contains the first proxy module, and the second communication module contains the second proxy module;

after the dual-network dual-standby terminal starts up, the first communication module reads the information in the identity identification card in the identity identification module, saves the information in the identity identification card into the first proxy module of the first communication module itself, and uses the information in the identity identification card to register to the 2G network;

the second communication module reads the information in the identity identification card in the first proxy module to save into the second proxy module of the second communication module itself, and uses the information in the identity identification card in the second proxy module to register to the 3G network or the 2G network.

Scheme Two

The identity identification module is only connected with the second communication module.

1. The proxy module is located in the application module; after the dual-network dual-standby terminal starts up, the second communication module reads the information in the identity identification card in the identity identification module, saves the information in the identity identification card into the proxy module, and uses the information in the identity identification card to register to the 3G network or the 2G network;

the first communication module reads the information in the identity identification card in the proxy module, and uses the read information to register to the 2G network.

2. The proxy module is located in first communication module and the second communication module, the proxy module is divided into a first proxy module and a second proxy module at the point, the first communication module contains the first proxy module, and the second communication module contains the second proxy module;

after the dual-network dual-standby terminal starts up, the second communication module reads the information in the identity identification card in the identity identification module, saves the information in the identity identification card into the second proxy module of the second communication module itself, and uses the information in the identity identification card to register to the 3G network or the 2G network;

the first communication module reads the information in the identity identification card in the second proxy module to save into the first proxy module of the first communication module itself, and uses the information in the identity identification card in the first proxy module to register to the 2G network.

Scheme Three

The identity identification module is connected with both the first communication module and the second communication module.

After the dual-network dual-standby terminal starts up, the first communication module and the second communication module read the information in the identity identification card in the identity identification module in turn, and use the information in the identity identification card to register to the corresponding networks.

That is, after the dual-network dual-standby terminal starts up, the first communication module reads the information in the identity identification card in the identity identification module, and uses the information in the identity identification card to register to the 2G network; after the dual-network dual-standby terminal starts up, the second communication module reads the information in the identity identification card in the identity identification module, and uses the information in the identity identification card to register to the 3G network or the 2G network.

In this case, the proxy module can be located in the application module, which provides control and management functions for the two communication modules which access the identity identification card.

Scheme Four

The proxy module is an independent module, the identity identification module is connected with the proxy module, and the proxy module is connected with the first communication module and the second communication module.

In this scheme, after the dual-network dual-standby terminal starts up, the proxy module reads and saves the information in the identity identification card.

The first communication module and the second communication module read the information in the identity identification card in the proxy module, and use the read information to register to the corresponding networks.

In addition, with regard to the application module, it can use a hardware architecture mode with an independent processor and also can be structured at a certain Modem side with a sufficiently powerful Central Processing Unit (CPU) processing capability in the present document. That is, the application module can use an independent CPU, it also can share a CPU with the first communication module, and it also can share a CPU with the second communication module.

The above 3G network can be a TD-SCDMA network, a Wideband Code Division Multiple Access (WCDMA) network and a CDMA2000 network, the 2G network can be a GSM network and a Code Division Multiple Access (CDMA) network. In the examples and application examples of the present document, the descriptions are mainly made by taking the 3G network as TD-SCMA network, 2G network as GSM network, taking the first communication module as a GSM wireless communication module and taking the second communication module as a TD-SCDMA/GSM dual-mode single-standby wireless communication module, but it is not limited to this, other types of 3G networks and 2G networks and corresponding communication modules are also applied to the present document.

A further description will be made through the application examples with the 3G network as the TD-SCDMA network and the 2G network as the GSM network below.

The architecture of dual Modems is used in the example, in the dual Modems, one refers to the single-mode GSM wireless communication module, and the other one refers to the TD-SCDMA/GSM dual-mode single-standby wireless communication module with a function of TD-SCDMA/GSM dual-mode handover. In the scheme, the single-mode GSM communication module will only register to a CS domain of the GSM network and be responsible for all CS services based on the GSM network of the current terminal; and the TD-SCDMA/GSM dual-mode single-standby wireless communication module will only register to a PS domain of the TD-SCDMA/GSM network or a PS domain of the GSM network in a mode of TD-SCDMA priority and be responsible for bearing all PS data services of the current terminal.

As shown in FIG. 2 to FIG. 7, the apparatus used for the dual-network dual-standby terminal implementing the service distribution in the present examples includes the following modules.

A. AP (Application) Module

Figure 3:
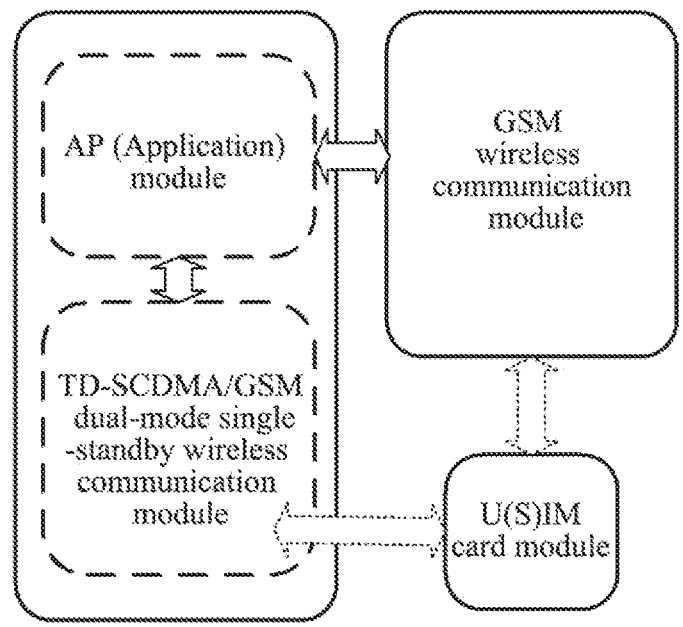
Figure 4:
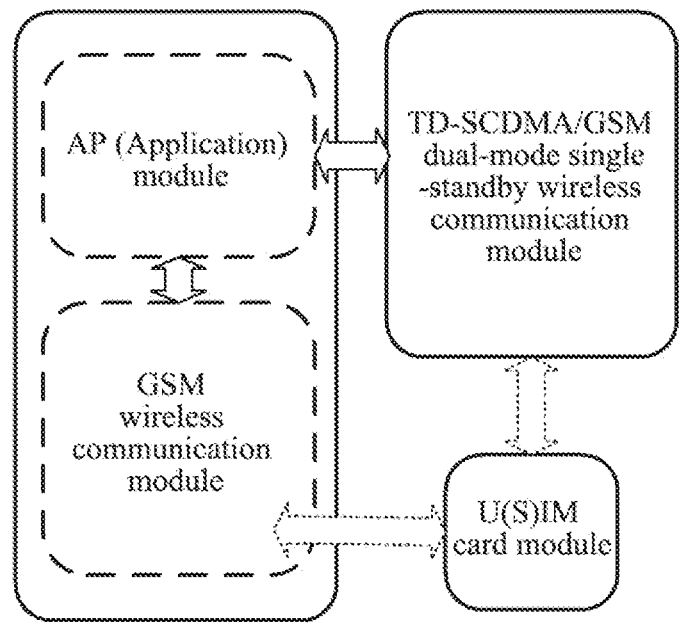
Figure 5:
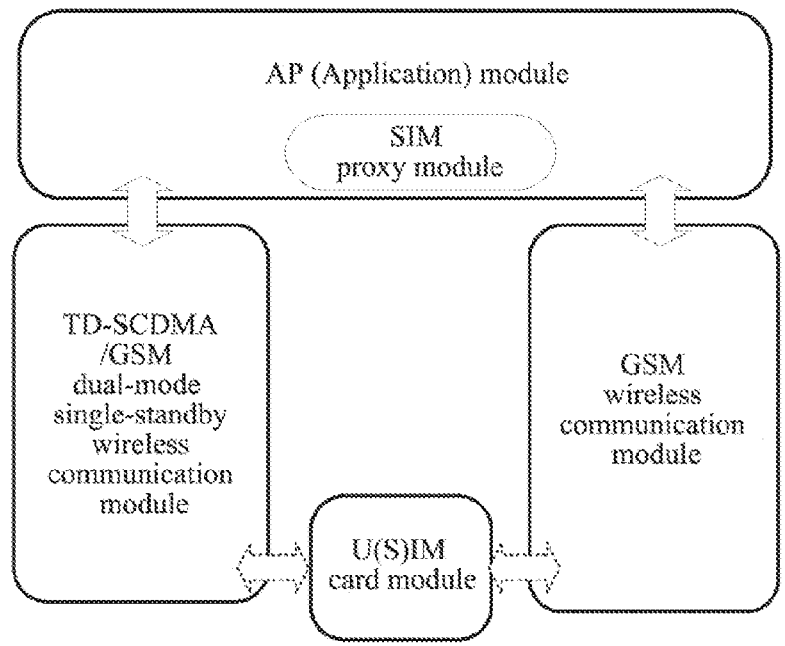
Figure 6:
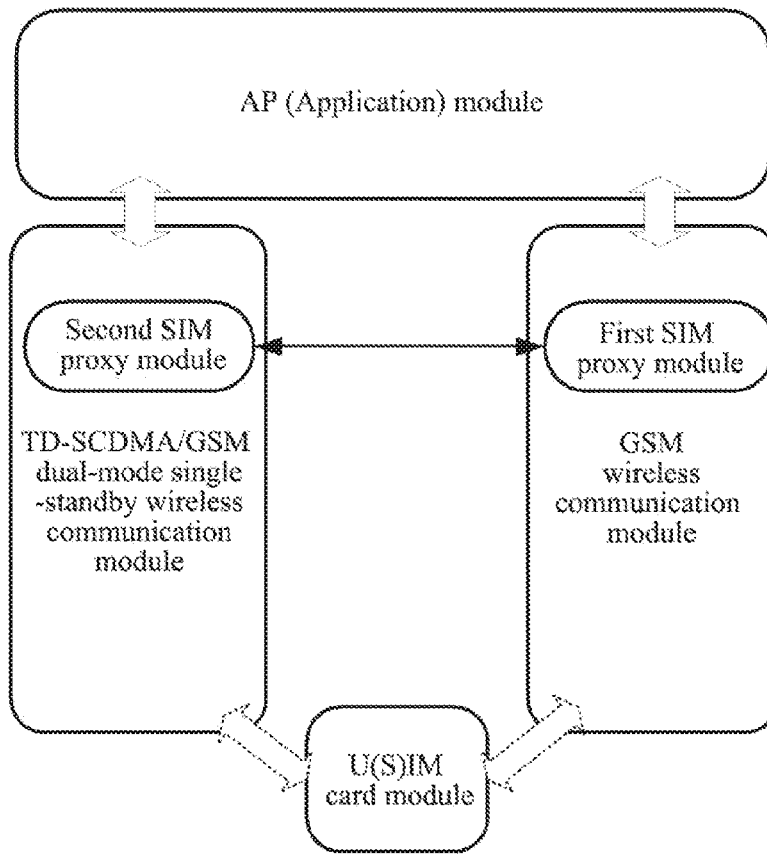
Figure 7:
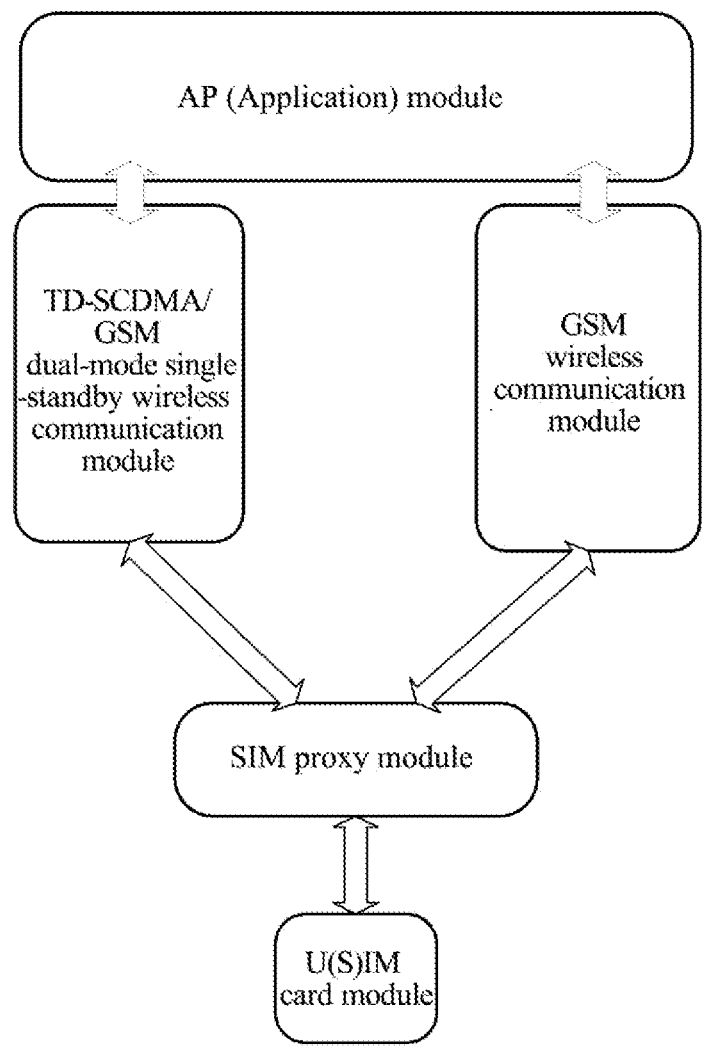

The application module is a master control module of the dual-network dual-standby terminal, it can be structured on an independent CPU (with reference to FIG. 2), and it also can be structured on the same processor together with a certain Modem (with reference to FIG. 3 and FIG. 4). In the scheme, on one hand, the application module is responsible for completing interactions with the users and processing local services and local logic parts of communication-type services such as calendar, calculator, alarm clock, dialer and communication interaction logic interface and so on unrelated to the network. On the other hand, the application module is also responsible for distributing services actively initiated by the users to communication modules of corresponding modes according to a logic of "CS services going through GSM Modem and PS services going through TD-SCDMA/GSM dual-mode Modem". It should be noted that, since a mobile videophone service is a service scheme based on a CS domain of the TD-SCDMA network, this service will not be supported in the present terminal scheme. Because this service is insignificant for the telephone traffics of TD videophones at the present, besides that the videophones also have bearer modes based on the PS domain.

B. U(S)IM Card Module (Identity Identification Module)

The U(S)IM card module is responsible for reading user identification information and authentication information in a U(S)IM card to perform the interaction with the network side; performing the update and management on service data on the card by means of a wireless air interface; and performing the management on user personal information such as telephone number and shot message and so on stored in the card.

With regard to which wireless communication module is hooked by the U(S)IM card module, there exist the following selection policies.

1. When selecting to hook on a TD/GSM dual-mode wireless communication module, a GSM wireless communication module is required to indirectly access data information of the U(S)IM card through an SIM Proxy module when performing CS services.

2. When selecting to hook on the GSM wireless communication module, a TD wireless communication module is required to indirectly access data information of the U(S)IM card through the SIM Proxy module when performing PS services. It should be noted that all commercial GSM Modems in the market only support an SIM card at the present, and they are required to be upgraded according to a UIM card interface protocol for supporting a UIM card.

3. If selecting to hook the U(S)IM card module on the two wireless communication modules simultaneously, besides it is required to perform compatibility alternation of the UIM card on the GSM wireless communication module, the mutual-exclusion control also can be performed on read-write access timing sequence of the U(S)IM card through the SIM Proxy module, this is required to make a modification on a standard card interface protocol, and a special U(S)IM is required when performing services.

4. If selecting to hook the U(S)IM card module on the SIM Proxy module, both the GSM wireless communication module and the TD/GSM dual-mode wireless communication module access data information of the U(S)IM card through the SIM Proxy module.

C. TD/GSM Dual-Mode Single-Standby Wireless Communication Module

The CS domain function is removed from the module based on the commercial TD-SCDMA MODEM with the function of TD-SCDMA/GSM dual-mode handover at present, that is, the current terminal only register to the PS domain of the TD network or the PS domain of the GSM network through the wireless module. The functions of the module are specifically described below.

1. During the initialization, a mode of TD-SCDMA priority is used to only register and attach to the PS domain of the TD-SCDMA network.

2. During the standby or performing services, it is responsible for monitoring the signal strength of TD-SCDMA network in which the terminal is located currently and awaiting an opportunity to initiate a 2/3G network handover in the PS domain.

3. Access and management is performed on data of the U(S)IM card module hooked on the current module; when selecting to hook the U(S)IM card module on the GSM wireless communication module side or to hook the U(S)IM card module on the SIM Proxy module side, the current module can access and read/write the data of the U(S)IM card through the SIM Proxy module.

D. GSM Wireless Communication Module

With regard to the GSM wireless communication module, its functions mainly are:

1. During the initialization, it only register to the CS domain of the GSM network.

2. During the standby or performing services, it is only responsible for bearing all CS circuit domain services except the TD-SCDMA videophones of the entire terminal.

3. Access and management is performed on data of the U(S)IM card module hooked on the current module; when selecting to hook the U(S)IM card module on the TD-SCDMA/GSM dual-mode single-standby wireless communication module side or to hook the U(S)IM card module on the SIM Proxy module side, the GSM wireless communication module can access and read/write the data of the U(S)IM card through the SIM Proxy module. It should be noted that all commercial GSM Modems in the market only support the SIM card at the present, and they are required to be upgraded according to the UIM card interface protocol for supporting the UIM card.

E. SIM Proxy Module (Proxy Module)

The SIM Proxy module mainly implements the access control and sharing by the two wireless communication modules on data of the U(S)IM card. The SIM Proxy module can be located in the application module (with reference to FIG. 5), and it is also can be divided into a first SIM Proxy module and a second SIM Proxy module, which are located in the GSM wireless communication module and the TD-SCDMA/GSM dual-mode single-standby wireless communication module respectively (with reference to FIG. 6). The module also can be an independent module (with reference to FIG. 7).

The different cases for selecting wireless communication modules hooked by the U(S)IM card module are:

1. When the U(S)IM card module is hooked on the TD-SCDMA/GSM dual-mode single-standby wireless communication module side, the SIM Proxy module provides a proxy service function of accessing data information of the U(S)IM card for the GSM wireless communication module.

2. When the U(S)IM card module is hooked on the GSM wireless communication module, the SIM Proxy module provides a proxy service function of accessing data information of the U(S)IM card for the TD wireless communication module.

3. When the U(S)IM card module is hooked on the two wireless communication modules simultaneously, the SIM Proxy module provides the control and management function for the two wireless communication modules accessing the U(S)IM card.

4. When the U(S)IM card module is hooked on the SIM Proxy module side, the SIM Proxy module provides a proxy service function of accessing data information of the U(S) IM card for the GSM wireless communication module and the TD-SCDMA/GSM dual-mode single-standby wireless communication module.

When the terminal starts up, if the U(S)IM card module is selected to hook on a certain wireless communication module, the wireless communication module connected to the U(S)IM card module reads relevant parameters on the card to complete flows such as initialization and network registration and so on of the current communication module, meanwhile it also can share the read relevant U(S)IM card information with the wireless communication module at the other side through the SIM Proxy module, so as that the Modem at the other side also can complete the same work; if the U(S)IM card module is selected to hook on the two wireless communication modules with different systems simultaneously or hook on an independent SIM Proxy module, the SIM Proxy module will be responsible for controlling the two wireless communication modules to orderly read the relevant parameters on the card so as to complete flows such as Modem initialization and network registration and so on. After starting up, the SIM Proxy module also will uniformly coordinate and take charge of the two wireless communication modules performing read-write operation and data sharing on the U(S)IM card module. When the communication modules are initialized, the GSM wireless communication module will only register to the CS domain of the GSM network, and the TD/GSM dual-mode single-standby communication module will only register to the PS domain of the corresponding network.

When services are performed, a user using the telephone is taken as an example, when the user actively makes a voice call, the application module invokes a GSM wireless communication module to interact with the GSM network according to a logic of "CS services going through GSM communication module and PS services going through TD/GSM dual-mode single-standby communication module", and performs communication with the opposite party through a GSM network bearer. When being called, a network device establishes a link with the GSM wireless communication module of the terminal according to information registered by the terminal at the network side and bears the services. Other flows of CS services such as short message and so on are also similar.

When the user surfs on the Internet through a browser, the application module establishes a data link with a corresponding network and bears the services through the TD-SCDMA/GSM dual-mode single-standby communication module which only register to the PS domain according to a logic of "CS services going through GSM communication module and PS services going through TD-SCDMA/GSM dual-mode single-standby communication module". Since this communication module itself possesses the function of TD-SCDMA/GSM dual-mode handover, when the TD-SCDMA network environment changes, a handover way of PS service network bearing will be processed by the current module itself, and it is not required to coordinate the GSM communication module to temporarily bear the data services through the application module. The mechanism and way for processing has no difference from that of the commercial TD-SCDMA/GSM dual-mode single-standby terminal now, which will not be described in detail here.

The data services in other forms, except multimedia message services and PushMail services where it is required to passively receive PUSH notification message through a CS circuit domain at first when receiving relevant mails and then the terminal actively initiates data links with the related service servers to download relevant text, are the same as the PS services of surfing on the Internet through the browser. In an interaction flow of receiving services between the multimedia message services and PushMail services, the PUSH notification message will be sent to the application module of the terminal through the GSM wireless communication module, and the terminal will download the relevant text through a PS service channel taken charge by the TD-SCDMA/GSM dual-mode single-standby communication module again.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred examples of the present document, which is not used to limit the present document. The present document can have various modifications and changes for the skilled in the art. All the modifications, equivalent substitutions, and improvements, etc. made within the spirit and principle of the present document shall fall into the protection scope of the present document.

INDUSTRIAL APPLICABILITY

With the method and apparatus of the present document, compared with the existing 2/3G dual-mode single-standby terminal technology, and when considering both the advantage of CS services of 2G network and the advantage of data services of 3G network, the probability of dual-mode handover is reduced through the dual-network dual-standby technology (only a part of handover exists during the data services), which fundamentally reduces and avoids the failures such as frequent network reselection, serious power consumption, call drops and off-network and so on caused by the 2/3G dual-mode single-standby terminal due to the 2G/3G dual-mode handover policy. The user experience of the terminal is improved, and the development of the 3G network is also promoted.

Moreover, in the technical scheme of the present document, it is not required to make a change on the network, and the operators can almost solve the problems faced currently with zero investment.

What is claimed is:

1. A method for a dual-network dual-standby terminal implementing service distribution, wherein, the dual-network dual-standby terminal comprises an application module, a first communication module and a second communication module, and the method comprising:

when a user of the dual-network dual-standby terminal initiates a Circuit Switched (CS) service, the application module selecting the first communication module, and the first communication module performing communication through a 2G network;

when a user of the dual-network dual-standby terminal initiates a Packet Switched (PS) service, the application module selecting the second communication module, and the second communication module performing communication through a 3G network or a 2G network;

wherein, the dual-network dual-standby terminal further comprises an identity identification module, the identity identification module is connected with the first communication module and the second communication module, an identity identification card is inserted in the identity identification module, and information used for the 2G network and the 3G network performing identity authentication is saved in the identity identification card;

the method further comprises:

after the dual-network dual-standby terminal starts up, the first communication module and the second communication module reading the information in the identity identification card in the identity identification module respectively, and using the information in the identity identification card to register to the corresponding networks;

wherein the dual-network dual-standby terminal further comprises an identity identification module, the identity identification module is connected with the first communication module, an identity identification card is inserted in the identity identification module, and information used for the 2G network and the 3G network performing identity authentication is saved in the identity identification card; the first communication module contains a first proxy module, and the second communication module contains a second proxy module; the method further comprises: after the dual-network dual-standby terminal starts up, the first communication module reading the information in the identity identification card in the identity identification module, saving the information in the identity identification card into the first proxy module of the first communication module itself, and using the information in the identity identification card to register to the 2G network; the second communication module reading the information in the identity identification card in the first proxy module to save into the second proxy module of the second communication module itself, and using the information in the identity identification card in the second proxy module to register to the 3G network or the 2G network;

or the dual-network dual-standby terminal further comprises an identity identification module, the identity identification module is connected with the second communication module, an identity identification card is inserted in the identity identification module, and information used for the 2G network and the 3G network performing identity authentication is saved in the identity identification card; the first communication module contains a first proxy module, and the second communication module contains a second proxy module; the method further comprises: after the dual-network dual-standby terminal starts up, the second communication module reading the information in the identity identification card in the identity identification module, saving the information in the identity identification card into the second proxy module of the second communication module itself, and using the information in the identity identification card to register to the 3G network or the 2G network; the first communication module reading the information in the identity identification card in the second proxy module to save into the first proxy module of the first communication module itself, and using the information in the identity identification card in the first proxy module to register to the 2G network;

or the dual-network dual-standby terminal further comprises an identity identification module and a proxy module which are connected, the proxy module is connected with the first communication module and the second communication module, an identity identification card is inserted in the identity identification module, and information used for the 2G network and the 3G network performing identity authentication is saved in the identity identification card; the method further comprises: after the dual-network dual-standby terminal starts up, the proxy module reading and saving the information in the identity identification card; the first communication module and the second communication module reading the information in the identity identification card in the proxy module, and using the read information to register to the corresponding networks.

2. The method according to claim 1, wherein,
in the step of the second communication module performing communication through a 3G network or a 2G network,
the second communication module preferentially selects to perform communication through the 3G network.

3. The method according to claim 1, wherein,
the 3G network is a Time Division-Synchronous Code Division Multiple Access (TD-SCDMA) network, and the 2G network is a Global System for Mobile Communication (GSM) network;
the first communication module is a GSM wireless communication module, and the second communication module is a TD-SCDMA/GSM dual-mode single-standby wireless communication module.

4. An apparatus used for a dual-network dual-standby terminal implementing service distribution, comprising an application module, a first communication module and a second communication module, wherein:
the application module is configured to: when a user of the dual-network dual-standby terminal initiates a Circuit Switched (CS) service, select the first communication module, and when a user of the dual-network dual-standby terminal initiates a Packet Switched (PS) service, select the second communication module;
the first communication module is configured to: perform communication through a 2G network according to the selection of the application module;
the second communication module is configured to: perform communication through a 3G network or a 2G network according to the selection of the application module;
wherein the apparatus further comprises an identity identification module, which is connected with the first communication module and the second communication module, an identity identification card is inserted in the identity identification module, and information used for the 2G network and the 3G network performing identity authentication is saved in the identity identification card;
the first communication module is further configured to: after the dual-network dual-standby terminal starts up, read the information in the identity identification card in the identity identification module, and use the information in the identity identification card to register to the 2G network;
the second communication module is further configured to: after the dual-network dual-standby terminal starts up, read the information in the identity identification card in the identity identification module, and use the information in the identity identification card to register to the 3G network or the 2G network;
wherein
the apparatus further comprises an identity identification module, wherein the identity identification module is connected with the first communication module, an identity identification card is inserted in the identity identification module, and information used for the 2G network and the 3G network performing identity authentication is saved in the identity identification card; the first communication module contains a first proxy module, and the second communication module contains a second proxy module;
the first communication module is further configured to: after the dual-network dual-standby terminal starts up, read the information in the identity identification card in the identity identification module, save the information in the identity identification card into the first proxy module of the first communication module itself, and use the information in the identity identification card to register to the 2G network;
the second communication module is further configured to: read the information in the identity identification card in the first proxy module to save into the second proxy module of the second communication module itself, and use the information in the identity identification card in the second proxy module to register to the 3G network or the 2G network;
or the apparatus further comprises an identity identification module, wherein the identity identification module is connected with the second communication module, an identity identification card is inserted in the identity identification module, and information used for the 2G network and the 3G network performing identity authentication is saved in the identity identification card; the first communication module contains a first proxy module, and the second communication module contains a second proxy module;

the second communication module is further configured to: after the dual-network dual-standby terminal starts up, read the information in the identity identification card in the identity identification module, save the information in the identity identification card into the second proxy module of the second communication module itself, and use the information in the identity identification card to register to the 3G network or the 2G network;

the first communication module is further configured to: read the information in the identity identification card in the second proxy module to save into the first proxy module of the first communication module itself, and use the information in the identity identification card in the first proxy module to register to the 2G network;

or the apparatus further comprises an identity identification module and a proxy module which are connected, wherein the proxy module is connected with the first communication module and the second communication module, an identity identification card is inserted in the identity identification module, and information used for the 2G network and the 3G network performing identity authentication is saved in the identity identification card;

the proxy module is configured to: after the dual-network dual-standby terminal starts up, read and save the information in the identity identification card;

the first communication module is further configured to: read the information in the identity identification card in the proxy module, and use the read information to register to the 2G network;

the second communication module is further configured to: read the information in the identity identification card in the proxy module, and use the read information to register to the 3G network or the 2G network.

5. The apparatus according to claim 4, wherein, the second communication module is configured to: preferentially select to perform communication through the 3G network.

6. The apparatus according to claim 4, wherein, the 3G network is a Time Division-Synchronous Code Division Multiple Access (TD-SCDMA) network, and the 2G network is a Global System for Mobile Communication (GSM) network;

the first communication module is a GSM wireless communication module, and the second communication module is a TD-SCDMA/GSM dual-mode single-standby wireless communication module.

* * * * *